United States Patent
Wang et al.

(10) Patent No.: US 10,390,210 B2
(45) Date of Patent: Aug. 20, 2019

(54) ACCESS METHOD, USER EQUIPMENT AND SERVER

(71) Applicant: SHENZHEN TUGE INFORMATION CO., LTD., Shenzhen (CN)

(72) Inventors: Kaihang Wang, Shenzhen (CN); Heng Zhang, Shenzhen (CN); Jianhua Li, Shenzhen (CN); Hao Zhou, Shenzhen (CN); Junfeng Zhang, Shenzhen (CN)

(73) Assignee: SHENZHEN TUGE INFORMATION CO., LTD., Shenzhen (CN)

( * ) Notice: Subject to any disclaimer, the term of this patent is extended or adjusted under 35 U.S.C. 154(b) by 0 days.

(21) Appl. No.: 16/028,557

(22) Filed: Jul. 6, 2018

(65) Prior Publication Data

US 2018/0317081 A1    Nov. 1, 2018

Related U.S. Application Data

(63) Continuation of application No. PCT/CN2017/070253, filed on Jan. 5, 2017.

(30) Foreign Application Priority Data

Jan. 6, 2016  (CN) .............................. 201610005562

(51) Int. Cl.
  *H04W 4/00* (2018.01)
  *H04W 8/02* (2009.01)
  (Continued)

(52) U.S. Cl.
  CPC .......... *H04W 8/02* (2013.01); *H04L 61/1588* (2013.01); *H04W 12/06* (2013.01);
  (Continued)

(58) Field of Classification Search
  CPC ........ H04W 8/02; H04W 76/30; H04W 84/12
  (Continued)

(56) References Cited

U.S. PATENT DOCUMENTS

| | | | | |
|---|---|---|---|---|
| 2014/0018050 A1* | 1/2014 | Isidore | .............. | H04M 1/72519 455/414.1 |
| 2014/0200685 A1* | 7/2014 | Ngai | ...................... | G06F 1/206 700/33 |
| 2015/0079985 A1* | 3/2015 | Vuchula | ................ | H04W 48/16 455/435.1 |

FOREIGN PATENT DOCUMENTS

CN          104394522 A       3/2015

* cited by examiner

*Primary Examiner* — Nghi H Ly

(57) ABSTRACT

Embodiments of the present disclosure disclose an access method, which comprises: establishing a first connection between a user equipment and a first mobile communication network according to a first subscriber identification number; requesting, via the first connection, a server to assign a subscriber identification number to the user equipment, wherein the subscriber identification number is a subscriber identification number corresponding to a SIM card in the server, and the subscriber identification number is a subscriber identification number at a location where the user equipment is currently located; acquiring, via the first connection, the second subscriber identification number assigned by the server; and establishing a second connection between the user equipment and a second mobile communication network servicing the current location according to the second subscriber identification number. According to the embodiments of the present disclosure, the roaming communication fees are reduced, and the communication quality is improved.

16 Claims, 9 Drawing Sheets

(51) Int. Cl.
  *H04W 12/06* (2009.01)
  *H04W 76/14* (2018.01)
  *H04W 64/00* (2009.01)
  *H04L 29/12* (2006.01)
  *H04W 76/30* (2018.01)
  *H04W 84/12* (2009.01)

(52) U.S. Cl.
  CPC ......... *H04W 64/006* (2013.01); *H04W 76/14* (2018.02); *H04W 76/30* (2018.02); *H04W 84/12* (2013.01)

(58) Field of Classification Search
  USPC ................ 455/432.1, 435.1, 422.1, 558, 418
  See application file for complete search history.

ACCESS METHOD, USER EQUIPMENT AND SERVER

CROSS-REFERENCE TO RELATED APPLICATIONS

The present application is a continuation of international application No. PCT/CN2017/070253 filed on Jan. 5, 2017, which claims priority to Chinese Patent Application No. 201610005562.4, filed on Jan. 6, 2016, both of which are hereby incorporated by reference in their entirety.

TECHNICAL FIELD

Embodiments of the present disclosure relate to the field of communications technologies, and in particular, relate to an access method, a user equipment and a server.

BACKGROUND

When a user roams outside China, communication services are provided by carriers outside China. As a result, international roaming causes very high roaming fees. With more and more frequent international communications or exchanges, it is an urgent issue to be addressed as how lowering high roaming fees in the international communication or exchanges.

In the related art, when a user roams to a foreign country, the user generally directly buy a subscriber identity module (SIM) card from a local carrier, and replace the original SIM card with the local SIM card, and then make communication by using the local SIM card, to avoid the high international roaming fees. However, if the user replaces the original SIM card with the new local SIM card, personal data stored in the original SIM card may not be conveniently migrated to the new local SIM card. In addition, once the user leaves the region supporting the new SIM card, the user inevitably needs to but another new local SIM card. This obviously increases the expenditure of the user, and causes inconvenience.

SUMMARY

Embodiments of the present disclosure provide an access method, a user equipment and a server, which can reduce roaming fees of a user with no need of replacing a SIM card in the user equipment.

An embodiment of the present disclosure provides an access method, including:

establishing a first connection between a user equipment and a first mobile communication network according to a first subscriber identification number;

requesting, via the first connection, a server to assign a subscriber identification number to the user equipment, wherein the subscriber identification number is a subscriber identification number corresponding to an entity SIM card managed by the server, and the subscriber identification number is a subscriber identification number at a location where the user equipment is currently located;

acquiring, via the first connection, a second subscriber identification number assigned by the server to the user equipment; and establishing a second connection between the user equipment and a second mobile communication network servicing the current location according to the second subscriber identification number.

In the access method according to another embodiment of the present disclosure, the establishing a second connection between the user equipment and a second mobile communication network servicing the current location according to the second subscriber identification number includes the following steps performed via the first connection:

initiating an access request to the second mobile communication network according to the second subscriber identification number;

acquiring an authentication request sent by the second mobile communication network;

sending the authentication request to the server, such that the SIM card in the server determines an authentication response according to the authentication request;

acquiring the authentication response sent by the server; and sending the authentication response to the second mobile communication network, to establish the second connection between the user equipment and the second mobile communication network.

Another embodiment of the present disclosure provides a user equipment, including:

a first connection establishing module, configured to establish a first connection between a user equipment and a first mobile communication network according to a first subscriber identification number;

a requesting module, configured to request, via the first connection, a server to assign a subscriber identification number to the user equipment, wherein the subscriber identification number is a subscriber identification number corresponding to an entity SIM card in the server, and the subscriber identification number is a subscriber identification number at a location where the user equipment is currently located;

a first acquiring module, configured to acquire, via the first connection, a second subscriber identification number assigned by the server to the user equipment; and a second connection establishing module, configured to establish a second connection between the user equipment and a second mobile communication network servicing the current location according to the second subscriber identification number.

In the user equipment according to another embodiment of the present disclosure, the second connection establishing module includes:

a first access requesting unit, configured to initiate an access request to the second mobile communication network via the first connection according to the second subscriber identification number;

a first acquiring unit, configured to acquire an authentication request sent by the second mobile communication network via the first connection;

a first sending unit, configured to send the authentication request to the server via the first connection, such that the entity SIM card in the server determines an authentication response according to the authentication request;

a second acquiring unit, configured to acquire, via the first connection, the authentication response sent by the server; and a second sending unit, configured to send the authentication response to the second mobile communication network via the first connection, to establish the second connection between the user equipment and the second mobile communication network.

Another embodiment of the present disclosure provides another access method, including:

acquiring a request from a user equipment via a first connection, wherein the request is used for requesting a server to assign a subscriber identification number to the user equipment, and the first connection is a connection between the user equipment and a first mobile communication network; and assigning a second subscriber identification number to the user equipment according to the request, such that the user equipment establishes a second connection with a local second mobile communication network at a location where the user equipment is located, wherein the second subscriber identification number is a subscriber identification number corresponding to an entity SIM card in the server.

Another embodiment of the present disclosure provides a server, including:

a second acquiring module, configured to acquire a request from a user equipment via a first connection, wherein the request is used for requesting a server to assign a subscriber identification number to the user equipment, and the first connection is a connection between the user equipment and a first mobile communication network; and an assigning module, configured to assign a second subscriber identification number to the user equipment according to the request, such that the user equipment establishes a second connection with a local second mobile communication network at a location where the user equipment is located, wherein the second subscriber identification number is a subscriber identification number corresponding to an entity SIM card in the server.

Another embodiment of the present disclosure provides another server, further including:

a third acquiring module, configured to acquire an authentication request sent by the user equipment, wherein the authentication request is sent by the second mobile communication network to the user equipment according to an access request from the user equipment; and a sending module, configured to send an authentication response to the user equipment, such that the user equipment establishes a second connection with the second mobile communication network according to the authentication response, wherein the authentication response is determined by the SIM card in the server according to the authentication request.

With the access method, the user equipment and the server according to the embodiments of the present disclosure, a first connection between a user equipment and a first mobile communication network is established according to a first subscriber identification number; a local second subscriber identification number at a location where the user equipment is currently located is then acquired via the first connection; and a second connection between the user equipment and the second mobile communication network is established according to a second subscriber identification number, such that the user equipment may establish a local wireless communication connection based on a local second subscriber identification number servicing the current location, and thus traffic fees are locally charged. Therefore, the fees of calls and traffic of a user may be conveniently lowered with no need to replace a SIM card of the user equipment.

BRIEF DESCRIPTION OF THE DRAWINGS

To describe embodiments of the present disclosure or the technical solution in the related art, hereinafter, drawings that are to be referred for description of the embodiments or the related art are briefly described. Apparently, the drawings described hereinafter merely illustrate some embodiments of the present disclosure. Persons of ordinary skill in the art may also derive other drawings based on the drawings described herein without any creative effort.

DETAILED DESCRIPTION

To make the objectives, technical solutions and advantages of the embodiments of the present disclosure clearer, the technical solutions according to the embodiments of the present disclosure are clearly and thoroughly described with reference to the accompanying drawings of the embodiments of the present disclosure. The described embodiments are merely exemplary ones, but are not all the embodiments of the present disclosure. Based on the embodiments of the present disclosure, all other embodiments derived by persons of ordinary skill in the art without any creative efforts shall fall within the protection scope of the present disclosure.

A user equipment in the embodiments of the present disclosure may refer to a device providing voice and data connectivity for a user, a handheld device having a wireless connection function, or other processing devices connected to a wireless modem. The user equipment may communicate with one or a plurality of core networks via a wireless access network (RAN), and may be a mobile terminal, such as a mobile phone, a mobile access device and a computer having a mobile terminal, for example, may be a portable, pocket, handheld, computer built-in or vehicle-mounted mobile apparatus or a portable broadband wireless apparatus, which exchange language and/or data with the wireless access network. For example, the user equipment may be a device such as a personal communication service (PCS) telephone, a cordless telephone, a Session Initiation Protocol telephone, a wireless local loop (WLL) station, a personal digital assistant (PDA), and the like. The user equipment may be also called a system, a subscriber unit, a subscriber station, a mobile station, a remote station, an access point, a remote terminal, an access terminal, a user terminal, a user agent, a user device or a user equipment.

In addition, the terms "system" and "network" may be interchangeably used herein. The term "and/or" used herein mainly signify a correlation between objects linked by this term, and denotes three possible relationships. For example, A and/or B may denote: singularly A, both A and B, and singularly B. In addition, the character "/" generally denotes an "or" relationship between two objects linked by this character. In the embodiments of the present disclosure, the terms "first" and "second" are used to differentiate the elements instead of denoting some specific sequences. For example, "first" and "second" in the "first subscriber identification number" and "second subscriber identification number" are only intended to signify that these two subscriber identification numbers are different from each other. When the user equipment sends a request to the server to request the server to assign a subscriber identification number thereto, the term "second" may not be used before "subscriber identification number".

Figure 1:
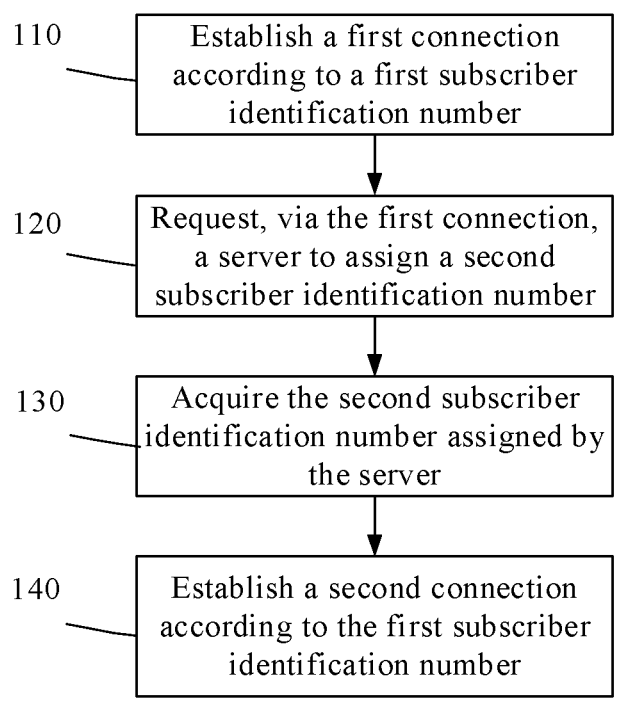
FIG. 1 is a flowchart of an access method according to one embodiment of the present disclosure.

FIG. 1 is a flowchart of an access method according to one embodiment of the present disclosure. As illustrated in FIG. 1, the access method according to one embodiment of the present disclosure includes the following steps:

Step 110: A first connection between a user equipment and a first mobile communication network is established according to a first subscriber identification number.

In the embodiments of the present disclosure, a subscriber identification number specifically refers to an international mobile subscriber identification number (IMSI). The subscriber identification number is stored in a SIM card, and includes validity information available for distinguishing the user equipment from others, which is a mark for distinguishing the user equipment from others.

In the embodiments of the present disclosure, the mobile communication network includes cellular networks in various communication modes, for example, various communication systems, such as current 2G and 3G communication systems and next generation communication systems, including: a global system for mobile communication (GSM) system, a code division multiple access (CDMA) system, a code division multiple access (TDMA) system, a Wideband code division multiple access wireless (WCDMA) system, a frequency division multiple access (FDMA) system, the orthogonal frequency-division multiple access (OFDMA) system, a general packet radio service (GPRS) system, a universal mobile telecommunications (UMTS) system, the long term evolution (LTE), and other such communication systems.

The user equipment is capable of accessing the mobile communication network only by using the subscriber identification number. The subscriber identification number includes a mobile country code (MCC) of a country to which a mobile user pertains. When the user equipment is in communication in the country corresponding to a country code in the subscriber identification number, that is, the user equipment is located in the territory of the country, and when the country where the user is located is consistent with the country code in the subscriber identification number, international roaming fees will not be charged. When the country where the user is located is inconsistent with the country code in the subscriber identification number, international roaming fees will be charged during the communication.

In this step, the user equipment establishes the first connection with the first mobile communication network by using the first subscriber identification number bound to the user equipment. It can be understood that the binding mentioned in the embodiments of the present disclosure may be electrical coupling of hardware entities. For example, the SIM card is inserted into the user equipment. The process for establishing the connection in this step may be implemented according to the process for establishing the connection in the related art, which is not limited in the embodiments of the present disclosure. It is noted that establishment of the first connection between the user equipment and the first mobile communication network may be: enabling a data channel between the user equipment and the first mobile communication network and establishing a data connection. Afterwards, the user equipment may perform data transmission via the first connection.

Step 120: A server is requested, via the first connection, to assign a subscriber identification number to the user equipment, wherein the subscriber identification number is a subscriber identification number corresponding to a SIM card in the server, and the subscriber identification number is a subscriber identification number at a location where the user equipment is currently located.

In this step, the user equipment sends a request, via the first connection which has been established with the first mobile communication network, to request the server to assign the subscriber identification number to the user equipment, wherein the subscriber identification number is the subscriber identification number at a location where the user equipment is currently located. It should be noted that, since the subscriber identification number assigned by the server to the user equipment is different from the first subscriber identification number currently used by the user equipment, which may be differentiated by using the term "second". However, when the user equipment sends a request to the server to request a subscriber identification number, the term "second" shall not be used to define the requested subscriber identification number. When the "second subscriber identification number" is used in the application, the term is only intended to indicate that the subscriber identification number is assigned by the server and is different from the subscriber identification number currently used by the user equipment.

It can be understood that the server includes a plurality of removable SIM cards, wherein each removable SIM card corresponds to a unique subscriber identification number. The user equipment requests, via the first connection, the server to assign the subscriber identification number to the user equipment, and the MCC in the assigned subscriber identification number may be consistent with the country code at a location where the user equipment is currently located. Information of the location where the user equipment is currently located may be carried in a request sent to the server, and may include an MCC or a mobile network code (MNC) which is successfully registered based on the first subscriber identification number. Alternatively, when the server does not store the subscriber identification number which is consistent with the country code at a location where the user equipment is currently located, the country represented by the country code in the assigned subscriber identification number may be a country which is geographically nearest or nearer to the country where the user is currently located, or has lowest or lower roaming fees.

Step 130: The second subscriber identification number assigned by the server is acquired via the first connection.

In this step, the user equipment receives the information from the server via the first connection, and acquires the second subscriber identification number assigned by the server, wherein the second subscriber identification number may be the subscriber identification number of the country where the user equipment is currently located. To be specific, the country code in the second subscriber identification number corresponds to the country where the user equipment is currently located.

Step 140: A second connection between the user equipment and a second mobile communication network servicing the current location is established according to the second subscriber identification number.

After acquiring the second subscriber identification number at a location where the user equipment is currently located, the user equipment establishes the second connection between the user equipment and the second mobile communication network servicing the current location according to the second subscriber identification number. It can be understood that the second mobile communication network in this step may be a cellular mobile communication network in any one of the GSM, UMTS, LTE or other further communication modes. In addition, the second mobile communication network in communication with the user equipment via the second connection may be consistent with the first mobile communication network in communication with the user equipment via the first connection. For example, both the first mobile communication network and the second mobile communication network are the mobile communication networks in the UTMS communication mode, in the GSM communication mode, or in the LTE communication mode. The first mobile communication network and the second mobile communication network may be the mobile communication networks in different communication modes. That is, the first mobile communication network and the second mobile communication network may be any combination of the above listed mobile communication networks, which is either not limited in the present disclosure.

The second connection established by the user equipment according to the second subscriber identification number is a local connection at a location where the user equipment is currently located, and the user may implement communication via this local connection.

In the embodiments of the present disclosure, a first connection between a user equipment and a first mobile communication network is established according to a first subscriber identification number; a local second subscriber identification number at a location where the user equipment is currently located is then acquired via the first connection; and a second connection between the user equipment and the second mobile communication network is established according to a second subscriber identification number, such that the user equipment may establish a local wireless communication connection by using a local second subscriber identification number servicing the current location, and thus traffic fees are locally charged. Therefore, the fees of calls and traffic of a user may be conveniently lowered with no need to replace a SIM card of the user equipment.

Figure 2:
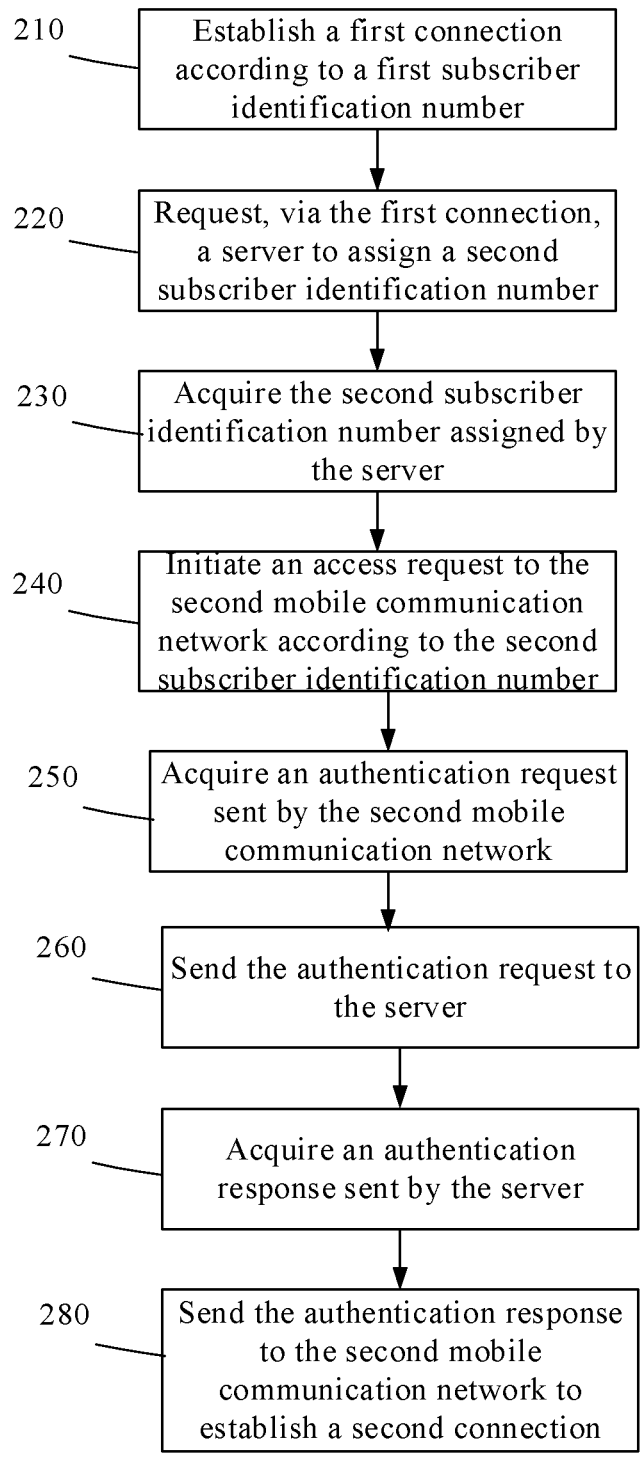
FIG. 2 is a flowchart of an access method according to another embodiment of the present disclosure.

FIG. 2 is a flowchart of an access method according to another embodiment of the present disclosure. As illustrated in FIG. 2, the access method according to the present disclosure includes the following steps:

Step 210: A first connection between a user equipment and a first mobile communication network is established according to a first subscriber identification number.

In this step, the specific operation for establishing the first connection between the user equipment and the first mobile communication network according to a first subscriber identification number may refer to step 110 in the embodiment corresponding to FIG. 1.

Step 220: A server is requested to assign a subscriber identification number to the user equipment via the first connection, wherein the assigned subscriber identification number is a subscriber identification number corresponding to a SIM card in the server, and the assigned subscriber identification number is a subscriber identification number at a location where the user equipment is currently located.

In this step, a server is requested to assign the subscriber identification number to the user equipment via the first connection, wherein the assigned subscriber identification number is a subscriber identification number corresponding to a SIM card in the server, and the assigned subscriber identification number is a subscriber identification number at a location where the user equipment is currently located. The specific operations may refer to step 120 of an embodiment corresponding to FIG. 1.

Step 230: The second subscriber identification number assigned by the server is acquired via the first connection.

In this step, the second subscriber identification number assigned by the server is acquired by the user equipment via the first connection established according to the first subscriber identification number. It can be understood that after the first connection is established, the user equipment may be in communication via the first connection, and step 230, step 240, step 250 and step 260 may be performed via the first connection which has been established by the user equipment. In addition, it can be understood that after acquiring the second subscriber identification number, the user equipment may store the second subscriber identification number.

Step 240: An access request is initiated, via the first connection, to the second mobile communication network according to the second subscriber identification number.

The user equipment initiates the access request, according to the second subscriber identification number, to the second mobile communication network via the first connection established according to the first subscriber identification number of the user equipment. In this step, the user equipment initiates the access request, according to the second subscriber identification number, to the second mobile communication network by using the corresponding module in the user equipment, such as a baseband unit, a radio frequency (RF) unit and a SIM card module.

Step 250: An authentication request sent by the second mobile communication network is acquired via the first connection.

The authentication request sent by the second mobile communication network is acquired via the first connection established according to the first subscriber identification number of the user equipment. After receiving the access request initiated by a terminal side, a network side may send the authentication request to the terminal side, wherein the authentication request may include authentication parameters, for example, an RAND and the like, and the specific parameters in the authentication request may be determined according to protocols of the mobile communication network in different communication modes, which is not limited in the present disclosure. In this step, the user equipment acquires the authentication request sent by the network side of the second mobile communication network.

Step S260: The authentication request is sent to the server via the first connection, such that the SIM card in the server determines an authentication response according to the authentication request.

It may be understood that after the user equipment receives authentication request parameters issued by a network side, an authentication circuit of the SIM card calculates an authentication response. In the embodiments of the present disclosure, since the second subscriber identification number corresponds to one entity SIM card managed in the server, in this step, the user equipment sends the authentication request acquired from the network side of the second mobile communication network to the server via the first connection established according to the first subscriber identification number, such that an authentication circuit of the removable SIM card in the server calculates the authentication response according to the parameters in the authentication request.

Step S270: the authentication response sent by the server is acquired via the first connection.

In this step, the user equipment acquires the authentication response, for example, a sign response (SRES), sent by the server via the first connection established according to the first subscriber identification number. The specific parameters of authentication of the mobile communication networks in different communication modes are defined according to the protocols in the related art. The specific parameters and specific signaling of authentication are not defined in the embodiments of the present disclosure. It is noted that the authentication response herein is determined by an authentication circuit of the removable SIM card in the server, via calculation according to the parameters in the authentication request issued by the second mobile communication network and forwarded by the user equipment.

Step S280: The authentication response is sent to the second mobile communication network via the first connection, to establish the second connection between the user equipment and the second mobile communication network.

In this step, the user equipment sends the authentication response acquired in step 270 to the second mobile communication network via the first connection established according to the first subscriber identification number, such that the network side of the second mobile communication network, after receiving the authentication response, establishes the second connection, that is, a local connection at a location where the user equipment is located, between the user equipment and the second mobile communication network. It is noted that the authentication response is determined, via calculation, by the authentication circuit of the removable SIM card in the server.

In the embodiments of the present disclosure, calculation of the authentication parameters may be implemented according to the existing protocols or other related arts, which is not limited in the present disclosure.

In the embodiments of the present disclosure, a user equipment initiates, according to a second subscriber identification number, an access request to a second mobile communication network via a first connection established according to a first subscriber identification number, sends authentication parameters issued by a network side to a server via the first connection, acquires an authentication response from the server, sends the authentication response to the network side, and establishes a second connection, such that such that the user equipment may be in communication directly via a local second connection by means of only transceiving less data via the roaming first connection to establish the local second connection. In this way, the roaming fees in international communication are greatly reduced, and since the second connection is a local connection at a location where the user equipment is currently located, the communication quality is further improved. Therefore, according to the solution in the embodiments of the present disclosure, the communication quality is improved while the roaming communication fees are reduced, and the user experience is enhanced while the tariff is lowered.

Figure 3:
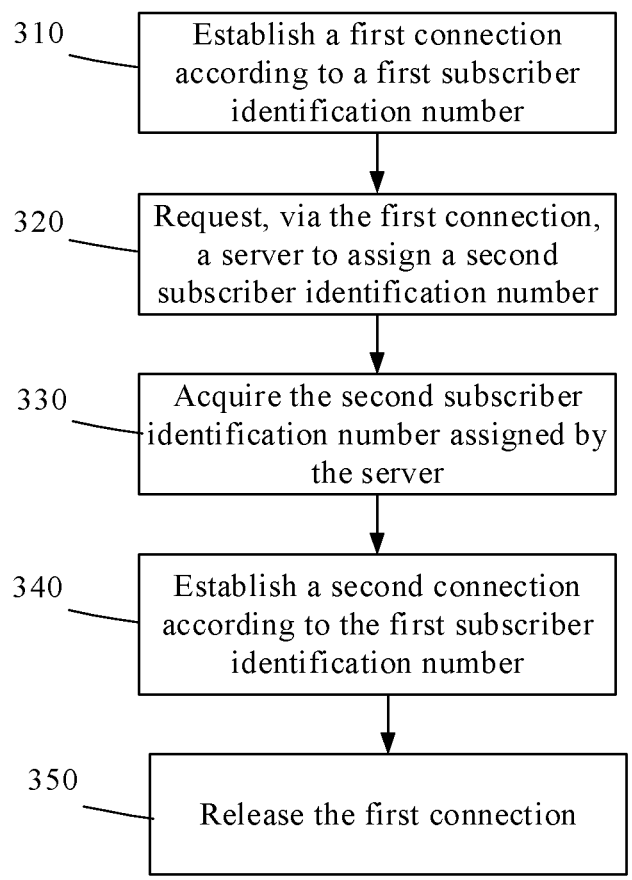
FIG. 3 is a flowchart of an access method according to still another embodiment of the present disclosure.

FIG. 3 is a flowchart of an access method according to still another embodiment of the present disclosure. As illustrated in FIG. 3, the access method according to the present disclosure includes the following steps:

Step 310: A first connection between a user equipment and a first mobile communication network is established according to a first subscriber identification number.

In this step, the specific operation for establishing the first connection between the user equipment and the first mobile communication network according to the first subscriber identification number may refer to step 110 in the embodiment corresponding to FIG. 1.

Step 320: A server is requested, via the first connection, to assign a subscriber identification number to the user equipment, wherein the assigned subscriber identification number is a subscriber identification number corresponding to a SIM card in the server, and the subscriber identification number is a subscriber identification number at a location where the user equipment is currently located.

In this step, the server is requested, via the first connection, to assign the subscriber identification number to the user equipment, wherein the assigned subscriber identification number is the subscriber identification number corresponding to a SIM card in the server, the assigned subscriber identification number is the subscriber identification number at a location where the user equipment is currently located, and the specific performed operations may refer to step 120 of an embodiment corresponding to FIG. 1.

Step 330: The second subscriber identification number assigned by the server is acquired via the first connection.

In this step, the specific operation for acquiring the second subscriber identification number assigned by the server via the first connection may refer to step 130 in the embodiment corresponding to FIG. 1.

Step 340: A second connection between the user equipment and a second mobile communication network servicing the current location is established according to the second subscriber identification number.

In this step, the specific operation for establishing the second connection between the user equipment and the second mobile communication network servicing the current location according to the second subscriber identification number may refer to step 140 in the embodiment corresponding to FIG. 1.

Step 350: The first connection between the user equipment and the first mobile communication network is released.

In this step, the first connection between the user equipment and the first mobile communication network is released. For example, after a second connection is established, a data channel of the first connection is disabled.

In the embodiments of the present disclosure, when establishing a local wireless connection, that is the second connection, with the second mobile communication network according to the second subscriber identification number, the user equipment enables a local communication. In this case, releasing the first connection, established according to the first subscriber identification number, between the user equipment and the first mobile communication network further saves international roaming communication fees.

Further, the establishing a first connection between a user equipment and a first mobile communication network according to a first subscriber identification number includes:

initiating an access request to the first mobile communication network according to the first subscriber identification number;

wherein the access request initiated to the first mobile communication network according to the first subscriber identification number is the access request of the international roaming, which is performed according to the related art or existing protocols;

acquiring an authentication request sent by the first mobile communication network;

wherein the user equipment may directly acquire and store the authentication request sent by the first mobile communication network, such that an authentication circuit of the SIM card corresponding to the first subscriber identification number bound to the user equipment performs authentication calculation according to the parameters in the authentication request; and sending an authentication response to the first mobile communication network according to a predetermined rule and the acquired authentication request, to establish the first connection.

In this step, the authentication response is sent to the first mobile communication network according to the predetermined rule and the acquired authentication request, to establish the first connection. To be specific, the authentication response is sent and calculated according to the mobile communication network in different communication modes to establish the first connection.

The first connection between the user equipment and the first mobile communication network is established via the SIM card corresponding to the first subscriber identification number bound to the user equipment, such that a local second connection is established via the first connection, and a local call at a location where the user equipment is currently located is implemented.

Further, the access method according to the embodiments of the present disclosure further includes: communicating with the server via the first connection.

To be specific, after establishing the first connection according to the first subscriber identification number, the user equipment is connected to the server via the first connection, such that the second subscriber identification number assigned by the server is received, and the relevant authentication parameters are sent and acquired, to establish the second connection and implement a local call, and reduce the roaming fees.

Further, the access method according to the embodiments of the present disclosure further includes: establishing, by the user equipment, a wireless local area network connection with a first user equipment.

In this embodiment, the user equipment may convert a mobile communication signal into a WiFi signal. For example, when the second mobile communication network is a 3G network, the user equipment converts a 3G signal into a Wi-Fi signal, and establishes the wireless local area network connection with the first user equipment, wherein the first user equipment may communicate with the user equipment via the Wi-Fi signal.

Figure 4:
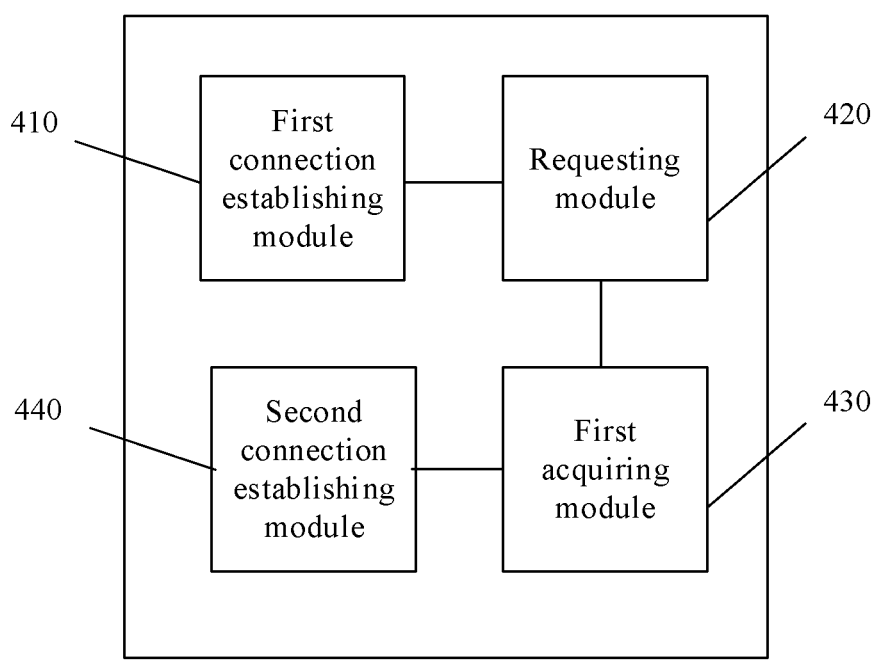
FIG. 4 is a schematic structural diagram of an access device according to one embodiment of the present disclosure.

FIG. 4 is a schematic structural diagram of an access device according to one embodiment of the present disclosure. As illustrated in FIG. 4, the user equipment of the present disclosure includes a first connection establishing module 410, a requesting module 420, a first acquiring module 430, and a second connection establishing module 440.

The first connection establishing module 410 is configured to establish a first connection between a user equipment and a first mobile communication network according to a first subscriber identification number.

The first connection establishing module 410 is configured to establish a first connection between a user equipment and a first mobile communication network according to a first subscriber identification number bound to the user equipment. The first connection establishing module herein may include a baseband processor and an RF circuit of the user equipment, and a SIM module corresponding to the first subscriber identification number. It can be understood that the binding mentioned in the embodiments of the present disclosure may be the electrical coupling of hardware entities, for example, the SIM card is inserted into the user equipment. The first connection, established the by first connection establishing module, between the user equipment and the first mobile communication network may be enabling a data channel between the user equipment and the first mobile communication network, and establishing data connection. Afterwards, the user equipment may transmit data via the first connection.

The requesting module 420 is configured to request, via the first connection a server to assign a subscriber identification number to the user equipment, wherein the subscriber identification number is a subscriber identification number corresponding to a SIM card in the server, and the subscriber identification number is a subscriber identification number at a location where the user equipment is currently located;

The requesting module 420 sends, via the first connection which has been established with the first mobile communication network, a request to a server to request the server to assign the subscriber identification number to the user equipment, wherein the subscriber identification number is the subscriber identification number at a location where the user equipment is currently located.

The first acquiring module 430 is configured to acquire, via the first connection, the second subscriber identification number assigned by the server.

The first acquiring module 430 receives, via the first connection, the information from the server, and acquires the second subscriber identification number assigned by the server, wherein the second subscriber identification number may be the subscriber identification number of a country where the user equipment is currently located, that is, a country code in the assigned second subscriber identification number corresponds to a country where the user equipment is currently located.

The second connection establishing module 440 is configured to establish a second connection between the user equipment and a second mobile communication network servicing the current location according to the second subscriber identification number.

After the first acquiring module 430 acquires the second subscriber identification number at a location where the user equipment is currently located, the second connection establishing module 440 establishes the second connection between the user equipment and the second mobile communication network servicing the current location according to the second subscriber identification number.

Figure 5:
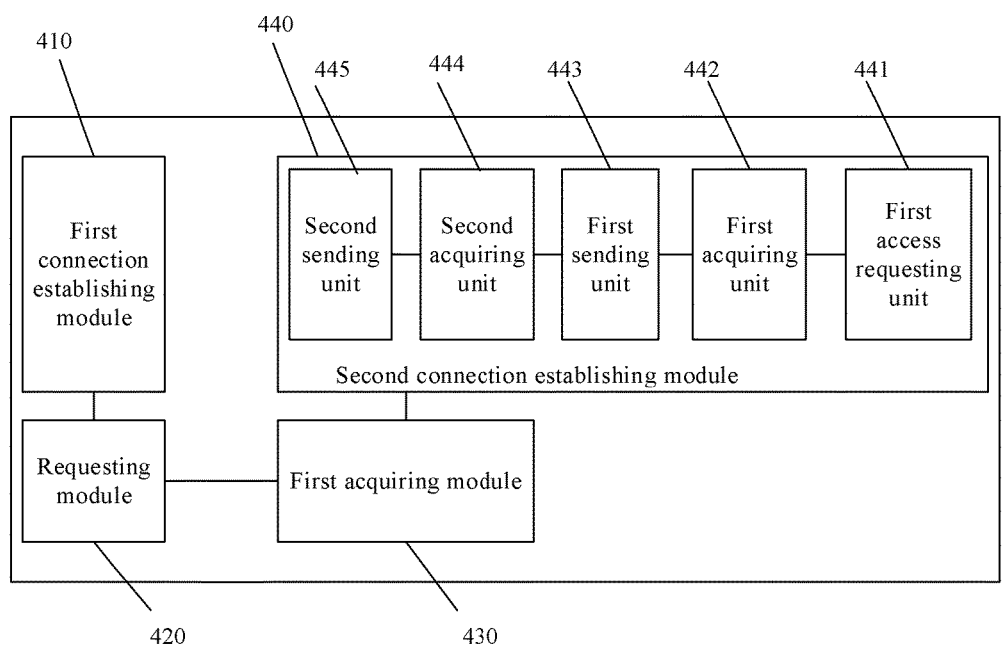
FIG. 5 is a schematic structural diagram of an access device according to another embodiment of the present disclosure.

In the embodiments of the present disclosure, a first connection establishing module establishes a first connection between a user equipment and a first mobile communication network according to a first subscriber identification number; a first acquiring module acquires, via the first connection, a local second subscriber identification number at a location where the user equipment is currently located; and a second connection establishing module establishes a second connection between the user equipment and a second mobile communication network according to the second subscriber identification number. In the embodiments of the present disclosure, the user equipment may establish a local wireless communication connection via the local second subscriber identification number servicing the current location, such that traffic fees are locally charged. Therefore, a user does not need to change SIM card of the user equipment, which conveniently reduces fees of calls and traffic. FIG. 5 is a schematic structural diagram of an access device according to another embodiment of the present disclosure. As illustrated in FIG. 5, a user equipment in the embodiments of the present disclosure includes a first connection establishing module 410, a requesting module 420, a first acquiring module 430, and a second connection establishing module 440, wherein the specific operations of the first connection establishing module 410, the requesting module 420 and the first acquiring module 430 may refer to those of the corresponding modules in the embodiment corresponding to FIG. 4. In addition, the second connection establishing module 440 includes a first access requesting unit 441, a first acquiring unit 442, a first sending unit 443, a second acquiring unit 444, and a second sending unit 445.

The first access requesting unit 441 is configured to initiate an access request to the second mobile communication network via the first connection according to the second subscriber identification number.

The first access requesting unit 441 of the user equipment initiates the access request, according to the second subscriber identification number, to the second mobile communication network via the first connection established according to a first subscriber identification number of the user equipment; wherein specifically, a baseband processing unit in the user equipment may be included.

The first acquiring unit 442 is configured to acquire an authentication request sent by the second mobile communication network via the first connection.

The first access requesting unit 441 of the user equipment acquires, via the first connection established according to the first subscriber identification number of the user equipment, an authentication request sent by the second mobile communication network. After receiving the access request initiated by a terminal side, a network side will send the authentication request to the terminal side, wherein the authentication request may include authentication parameters, for example, an RAND and the like, and the specific parameters in the authentication request may be determined according to protocols of the mobile communication network in different communication modes, which is not limited in the present disclosure. The first acquiring unit 442 of the user equipment acquires the authentication request sent by the second mobile communication network via the first connection.

The first sending unit 443, configured to send the authentication request to the server via the first connection, such that the SIM card in the server determines an authentication response according to the authentication request.

It may be understood that after the user equipment receives authentication request parameters issued by a network side, an authentication circuit of the SIM card calculates an authentication response. In the embodiments of the present disclosure, since the second subscriber identification number is assigned by the server to the user equipment according to a predetermined rule, the first sending unit 443 of the user equipment sends the authentication request acquired from the network side of the second mobile communication network to the server via the first connection established according to the first subscriber identification number, such that the authentication circuit of the removable SIM card in the server calculates the authentication response according to the parameters in the authentication request.

The second acquiring unit 444 is configured to acquire, via the first connection, the authentication response sent by the server.

The second acquiring unit 444 acquires, via the first connection established according to the first subscriber identification number, the authentication response sent by the server, for example, the parameter of an SRES. It is noted that the authentication response herein is determined by an authentication circuit of the removable SIM card in the server, via calculation according to the parameters in the authentication request issued by the second mobile communication network and forwarded by the user equipment.

The second sending unit 445 is configured to the authentication response to the second mobile communication network via the first connection, to establish the second connection between the user equipment and the second mobile communication network.

The second sending unit 445 of the user equipment sends the authentication response acquired by second acquiring unit 444 to the second mobile communication network via the first connection established according to the first subscriber identification number, such that the network side of the second mobile communication network establishes, after receiving the authentication response, the second connection, that is, a local connection at a location where the user equipment is located, between the user equipment and the second mobile communication network. It is noted that the authentication response is determined via calculation by the authentication circuit of the removable SIM card in the server.

In the embodiments of the present disclosure, how to calculate the authentication parameters may be implemented according to the existing protocols or other related arts, which is not limited in the present disclosure.

In the embodiments of the present disclosure, a user equipment initiates, according to a second subscriber identification number, an access request to a second mobile communication network via a first connection established according to a first subscriber identification number, sends authentication parameters issued by a network side to a server via the first connection, acquires an authentication response from the server, sends the authentication response to the network side and establishes a second connection, such that the user equipment may be in communication directly via a local second connection by means of only transceiving less data via the roaming first connection to establish the local second connection. In this way, the roaming fees in international communication are greatly reduced, and since the second connection is a local connection at a location where the user equipment is currently located, the communication quality is further improved. Therefore, according to the solution in the embodiments of the present disclosure, the communication quality is improved while the roaming communication fees are reduced, and the user experience is enhanced while the tariff is lowered.

Figure 6:
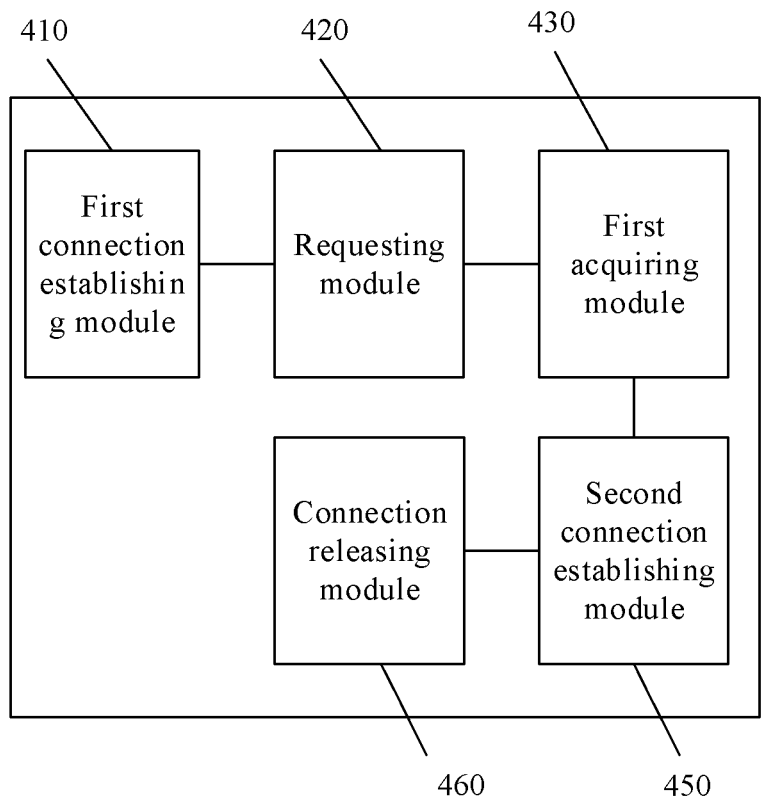
FIG. 6 is a schematic structural diagram of an access device according to still another embodiment of the present disclosure.

FIG. 6 is a schematic structural diagram of an access device according to still another embodiment of the present disclosure. As illustrated in FIG. 6, a user equipment in the embodiments of the present disclosure includes a first connection establishing module 410, a requesting module 420, a first acquiring module 430, and a second connection establishing module 440, wherein the specific operations of the first connection establishing module 410, the requesting module 420 and the first acquiring module 430 may refer to those of the corresponding modules in the embodiment corresponding to FIG. 4. In addition, the access device further includes:

a connection releasing module 460, configured to release the first connection between the user equipment and the first mobile communication network.

The connection releasing module 460 releases the first connection between the user equipment and the first mobile communication network. For example, the connection releasing module 460 disables a data channel of the first connection after it is confirmed that the connection has been established.

Further, the first connection establishing module 410 in the user equipment in the embodiments of the present disclosure includes:

a second access requesting unit, configured to initiate an access request to the first mobile communication network according to the first subscriber identification number;

wherein the access request initiated by second access requesting unit to the first mobile communication network according to the first subscriber identification number is the access request of the international roaming, which is performed according to the related art or existing protocols;

a third acquiring unit, configured to acquire an authentication request sent via the first mobile communication network;

wherein the third acquiring unit may directly acquire and store the authentication request sent by the first mobile communication network, such that an authentication circuit of the SIM card corresponding to the first subscriber identification number bound to the user equipment performs authentication calculation according to the parameters in the authentication request; and a third sending unit, configured to send an authentication response to the first mobile communication network according to a predetermined rule and the acquired authentication request, to establish the first connection;

wherein the third sending unit sends the authentication response to the first mobile communication network according to the predetermined rule and the acquired authentication request, to establish the first connection. To be specific, the authentication response is sent according to the mobile communication network in different communication modes to establish the first connection.

The first connection between the user equipment and the first mobile communication network is established via the SIM card corresponding to the first subscriber identification number bound to the user equipment, such that a local second connection is established via the first connection, and a local call at a location where the user equipment is currently located is implemented.

Further, the user equipment in the embodiments of the present disclosure further includes a first communication module, configured to communicate with the server via the first connection.

After the user equipment establishes the first connection according to the first subscriber identification number, the first communication module is connected to the server via the first connection, such that the second subscriber identification number assigned by the server is received, and the relevant authentication parameters are sent and acquired, to establish the second connection and implement a local call, and reduce the roaming fees.

Further, the user equipment in the embodiments of the present disclosure further includes:

a second communication module, configured to establish a wireless local area network connection with a first user equipment, such that the first user equipment may be in communication by using the second subscriber identification number.

When the second mobile communication network is a 3G network, the user equipment according to the embodiments of the present disclosure converts a 3G signal into a Wi-Fi signal, and establishes the wireless local area network connection with the first user equipment, wherein the first user equipment may communicate with the user equipment via the Wi-Fi signal. One or more first user equipments may be used herein.

Figure 7:
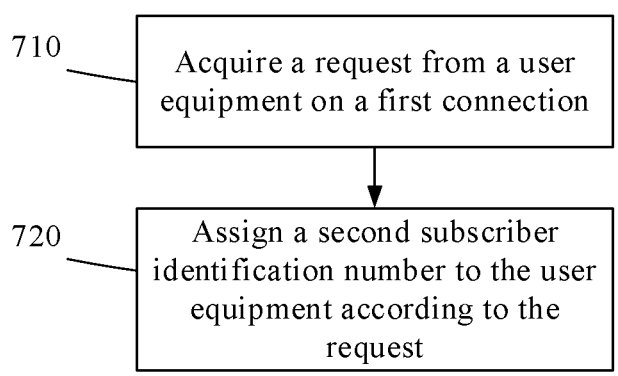
FIG. 7 is a flowchart of an access method according to one embodiment of the present disclosure.

FIG. 7 is a flowchart of an access method according to one embodiment of the present disclosure. As illustrated in FIG. 7, the access method in one embodiment of the present disclosure includes the following steps:

Step 710: A request from a user equipment is acquired via a first connection, wherein the request is used for requesting a server to assign a subscriber identification number to the user equipment, and the first connection is a connection between the user equipment and a first mobile communication network.

After establishing the first connection with the first mobile communication network according to a first subscriber identification number, the user equipment may establish a connection with a server. In this step, the server acquires a request from the user equipment via the first connection, wherein the request is used for requesting a server to assign the subscriber identification number to the user equipment. It can be understood that the server may acquire, from the request, information of the location where the user equipment is currently located, for example, an MCC, or a MNC of the mobile communication network acquired when the first subscriber identification number is successfully registered.

Step 720: The second subscriber identification number is assigned to the user equipment according to the request, such that the user equipment establishes a second connection with a local second mobile communication network at a location where the user equipment is located according to the second subscriber identification number, wherein the second subscriber identification number is a subscriber identification number corresponding to a SIM card in the server.

It may be understood that the server may have multiple removable SIM cards, and each of the removable SIM cards corresponds to a unique subscriber identification number. The server assigns the second subscriber identification number to the user equipment according to the received request, for example, the server may assign the second subscriber identification number to the user equipment based on the location where the user equipment is currently located in the request, such that the user equipment establishes the second connection of a local connection with the local second mobile communication network at a location where the user equipment is located according to the second subscriber identification number. It may be understood that the second connection is the local connection. An MCC in the second subscriber identification number assigned by the server may be consistent with the country where the user equipment is currently located. Alternatively, when the server does not have the subscriber identification number which is consistent with the country code at a location where the user equipment is currently located, the country represented by the country code in the second subscriber identification number may be a country which is geographically nearest or nearer to the country where the user is currently located, or has lowest or lower roaming fees.

In the embodiments of the present disclosure, the server assigns the second subscriber identification number to a user according to a user request, such that the user equipment is capable of establishing the connection with a lower tariff, and thus the roaming communication fees are reduced.

Further, in the access method in the embodiments of the present disclosure, the request carries information of the location where the user equipment is located.

When the request carries the information of the location where the user equipment is located, the assigning the second subscriber identification number to the user equipment according to the request specifically includes:

assigning the second subscriber identification number to the user equipment according to the information of the location where the user equipment is located, wherein the second subscriber identification number is a subscriber identification number at a location where the user equipment is currently located. It may be understood that the user equipment may acquire an MCC or MNC when the user equipment is successfully registered by using the first subscriber identification number. In this case, the MCC or the MNC may be used as the information of the location where the user equipment is located.

The location information herein may be as generic as information of a country where the user equipment is located, or may be as specific as region information of a province or state. The more accurate the location information is, the assigning module of the server may more specifically determine the second subscriber identification number for assignment. When the location is more accurate, the roaming communication fees are further reduced, and the communication quality is improved.

Further, in the access method in the embodiments of the present disclosure, the request carries type information of the user equipment. When the request carries type information of the user equipment, the assigning the second subscriber identification number to the user equipment according to the request specifically includes: assigning the second subscriber identification number to the user equipment according to the type information of the user equipment.

For example, the type information of the user equipment includes information of network operators, such as, China Unicom, or China Mobile; different user types, such as, user level, services supported by the user; user capability attribute, and the like. The server may assign, for example, the communication network in a UTMS or an LTE, to the user equipment according to this information.

Figure 8:
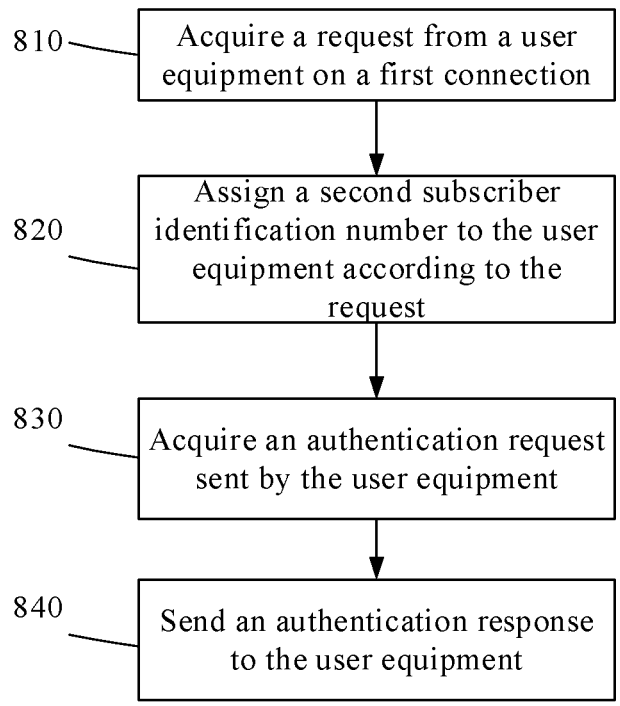
FIG. 8 is a flowchart of an access method according to another embodiment of the present disclosure.

FIG. 8 is a flowchart of an access method according to another embodiment of the present disclosure. As illustrated in FIG. 8, the access method according to one embodiment of the present disclosure includes the following steps:

Step 810: A request from a user equipment is acquired via a first connection, wherein the request is used for requesting a server to assign a subscriber identification number to the user equipment, and the first connection is a connection between the user equipment and a first mobile communication network.

In this step, the request from the user equipment is acquired via the first connection, wherein the request is used for requesting a server to assign a subscriber identification number to the user equipment, and the first connection is a connection between the user equipment and the first mobile communication network. The specific description may refer to step 710 in the embodiment corresponding to FIG. 7.

Step 820: The second subscriber identification number is assigned to the user equipment according to the request, such that the user equipment establishes a second connection with a local second mobile communication network at a location where the user equipment is located according to the second subscriber identification number, wherein the second subscriber identification number is a subscriber identification number corresponding to a SIM card in the server.

In this step, the second subscriber identification number is assigned to the user equipment according to the request, such that the user equipment establishes a second connection with a local second mobile communication network at a location where the user equipment is located according to the second subscriber identification number, wherein the second subscriber identification number is the subscriber identification number corresponding to a SIM card in the server. The specific description may refer to step 720 in the embodiment corresponding to FIG. 7.

Step 830: An authentication request sent by the user equipment is acquired, and the authentication request is sent by the second mobile communication network to the user equipment according to an access request from the user equipment.

After the user equipment receives authentication request parameters issued by a network side, an authentication circuit of the SIM card calculates an authentication response. In the embodiments of the present disclosure, since the second subscriber identification number corresponds to one entity SIM card managed in the server, the user equipment sends the authentication request acquired from the network side of the second mobile communication network to the server via the first connection established according to the first subscriber identification number. In this step, the server acquires the authentication request sent by the user equipment.

Step 840: The authentication response is sent to the user equipment, such that the user equipment establishes the second connection with the second mobile communication network according to the authentication response, and the authentication response is determined by the SIM card in the server according to the authentication request.

After the server receives the authentication request, the authentication circuit of the SIM card calculates and determines the authentication response. For example, an IMSI and a ciphering key (KI) stored in the removable SIM card of the server are used as input parameters of the A3 authentication operational circuit, an SRES of the authentication is calculated, and the calculated SRES is returned to the user equipment. As such, the user equipment sends the SRES of the authentication calculated by the server to the network side of the second mobile communication network, and a network-side MSC of the second mobile communication network compares the SRES in an original parameter group calculated by an authentication center (AuC) with the SRES returned by the user equipment. If the SRES in the original parameter group calculated by the AuC is the same as the SRES returned by the user equipment, it is considered that the user equipment is authorized, the authentication is successful, and the user equipment is allowed to access the network, such that the second connection is established.

In this step, the server sends the authentication response calculated and determined by the removable SIM card in the server to the user equipment, such that the user equipment establishes the second connection with the second mobile communication network according to the authentication response.

In the embodiments of the present disclosure, when a server receives an authentication request sent by a user equipment, a SIM card module calculates an authentication response according to authentication parameters, and sends the authentication response to the user equipment, such that the user equipment is capable of establishing a local second connection to make a local call with no need of purchasing and inserting removable SIM card. In this way, the roaming fees in international communication are greatly reduced, and since the second connection is a local connection at a location where the user equipment is currently located, the communication quality is further improved. Therefore, according to the solution in the embodiments of the present disclosure, the communication quality is improved while the roaming communication fees are reduced, and the user experience is enhanced while the tariff is lowered.

Figure 9:
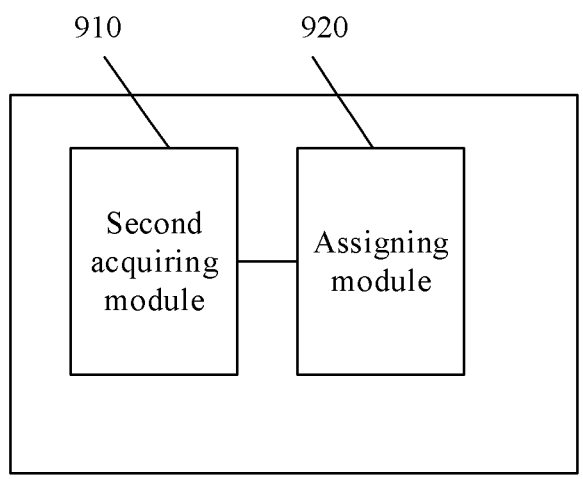
FIG. 9 is a schematic structural diagram of an access device according to one embodiment of the present disclosure.

FIG. 9 is a schematic structural diagram of an access device according to one embodiment of the present disclosure. As illustrated in FIG. 9, a server in the embodiments of the present disclosure includes a second acquiring module 910 and an assigning module 920.

The second acquiring module 910 is configured to acquire a request from a user equipment via a first connection, wherein the request is used for requesting the server to assign a subscriber identification number to the user equipment, and the first connection is a connection between the user equipment and a first mobile communication network.

The second acquiring module 910 of the server acquires the request from the user equipment via the first connection, wherein the request is used for requesting the server to assign the subscriber identification number to the user equipment. It may be understood that the server may acquire information of the location where the user equipment is currently located.

The assigning module 920 is configured to assign the second subscriber identification number to the user equipment according to the request, such that the user equipment establishes a second connection with a local second mobile communication network at a location where the user equipment is located, wherein the second subscriber identification number is a subscriber identification number corresponding to a SIM card in the server.

The server may have multiple removable SIM cards, wherein each of the removable SIM cards corresponds to a unique subscriber identification number. The assigning module 920 of the server assigns the second subscriber identification number to the user equipment according to the received request, for example, the server may assign the second subscriber identification number to the user equipment according to the location where the user equipment is currently located in the request, such that the user equipment establishes the second connection of a local connection with the local second mobile communication network at a location where the user equipment is located according to the second subscriber identification number. It can be understood that the second connection is the local connection. An MCC in the second subscriber identification number assigned by the server may be consistent with the country where the user equipment is currently located. Alternatively, when the server does not have the subscriber identification number which is consistent with the country code at a location where the user equipment is currently located, the country represented by the country code in the second subscriber identification number may be a country which is geographically nearest or nearer to the country where the user is currently located, or has lowest or lower roaming fees.

In the embodiments of the present disclosure, the server assigns the second subscriber identification number to a user according to a user request, such that the user equipment is capable of establishing the connection with a lower tariff, and thus the roaming communication fees are reduced.

Further, when the request acquired by the second acquiring module carries information of the location where the user equipment is located, the assigning module is configured to assign the second subscriber identification number to the user equipment according to the information of the location where the user equipment is located, wherein the second subscriber identification number is a subscriber identification number at a location where the user equipment is currently located.

The location information herein may be as generic as information of a country where the user equipment is located, or may be as specific as region information of a province or state. The more accurate the location information is, the assigning module of the server may more specifically determine the second subscriber identification number for assignment. It may be understood that when the location is more accurate, the roaming communication fees are further reduced, and the communication quality is improved.

Further, when the request acquired by the second acquiring module carries type information of the user equipment, the assigning module is configured to assign the second subscriber identification number to the user equipment according to the type information of the user equipment. For example, the type information of the user equipment includes information of network operators, such as, China Unicom, or China Mobile; different user types, such as, user level; services that are supported by the user; user capability attributes, and the like. The assigning module of the server assigns, for example, the communication network in a UTMS or an LTE, to the user equipment according to this information.

Figure 10:
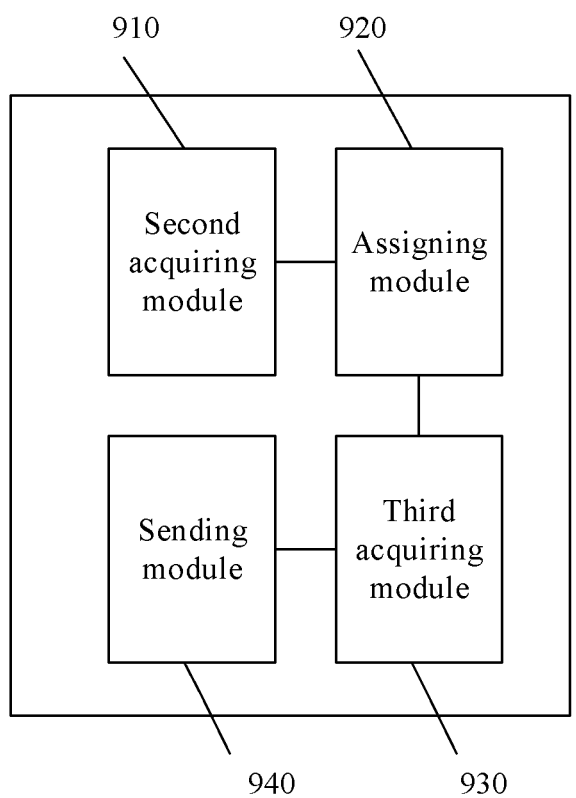
FIG. 10 is a schematic structural diagram of an access device according to another embodiment of the present disclosure.

FIG. 10 is a schematic structural diagram of an access device according to another embodiment of the present disclosure. As illustrated in FIG. 10, a server in the embodiments of the present disclosure includes a second acquiring module 910, an assigning module 920, a third acquiring module 930 and a sending module 940, wherein the specific operations of the second acquiring module 910 and the assigning module 920 may refer to those of the corresponding modules in the embodiment corresponding to FIG. 9.

The third acquiring module 930 is configured to acquire an authentication request sent by the user equipment, wherein the authentication request is sent by the second mobile communication network to the user equipment according to an access request from the user equipment.

After the user equipment receives authentication request parameters issued by a network side, an authentication circuit of the SIM card calculates an authentication response. In the embodiments of the present disclosure, since the second subscriber identification number corresponds to one entity SIM card managed in the server, the user equipment sends the authentication request acquired from the network side of the second mobile communication network to the server via the first connection established according to the first subscriber identification number. The third acquiring module 930 of the server acquires the authentication request sent by the user equipment.

The sending module 940 is configured to send an authentication response to the user equipment, such that the user equipment establishes a second connection with the second mobile communication network according to the authentication response, wherein the authentication response is determined by the SIM card in the server according to the authentication request.

After the server receives the authentication request, the authentication circuit of the SIM card calculates and determines the authentication response. For example, an IMSI and a KI stored in the removable SIM card in the server are used as input parameters of the A3 authentication operational circuit, an SRES of the authentication is calculated, and the calculated SRES is sent to the user equipment. As such, the user equipment sends the SRES of the authentication calculated by the server to the network side of the second mobile communication network, and a network-side MSC of the second mobile communication network compares the SRES in an original parameter group calculated by an AuC with the SRES returned by the user equipment. If the SRES in the original parameter group calculated by the AuC is the same as the SRES returned by the user equipment, it is considered that the user equipment is authorized, the authentication is successful, and the user equipment is allowed to access the network, such that the second connection is established.

The sending module 940 sends the authentication response calculated and determined by the removable SIM card in the server to the user equipment, such that the user equipment establishes the second connection with the second mobile communication network according to the authentication response.

In the embodiments of the present disclosure, when a server receives an authentication request sent by a user equipment, a SIM card module calculates an authentication response according to authentication parameters, and sends the authentication response to the user equipment, such that the user equipment is capable of establishing a local second connection to make a local call with no need of purchasing and inserting removable SIM card. In this way, the roaming fees in international communication are greatly reduced, and since the second connection is a local connection at a location where the user equipment is currently located, the communication quality is further improved. Therefore, according to the solution in the embodiments of the present disclosure, the communication quality is improved while the roaming communication fees are reduced, and the user experience is enhanced while the tariff is lowered.

Further, the server may include a plurality of SIM cards. These removable SIM cards may be arranged in an array in the server, and may be the SIM cards which are released in various countries and districts. To be more specific, the SIM card included in a server may be a local SIM card of the server, or may be a local SIM card nearer to the server. As such, when receiving the request for requesting the server to assign the subscriber identification number to the user equipment, the server may assign the subscriber identification number which is nearest in the distance at a location where the user equipment is currently located, or has lowest tariff to the user equipment.

Further, the SIM card in the server is a local SIM card at a location where the server is located. When the SIM card in the server is the local SIM card at a location where the server is located, and thus when the user equipment establishes the second connection by using the second subscriber identification number, the established connection has the lowest tariff, and the signal quality is best.

Figure 11:
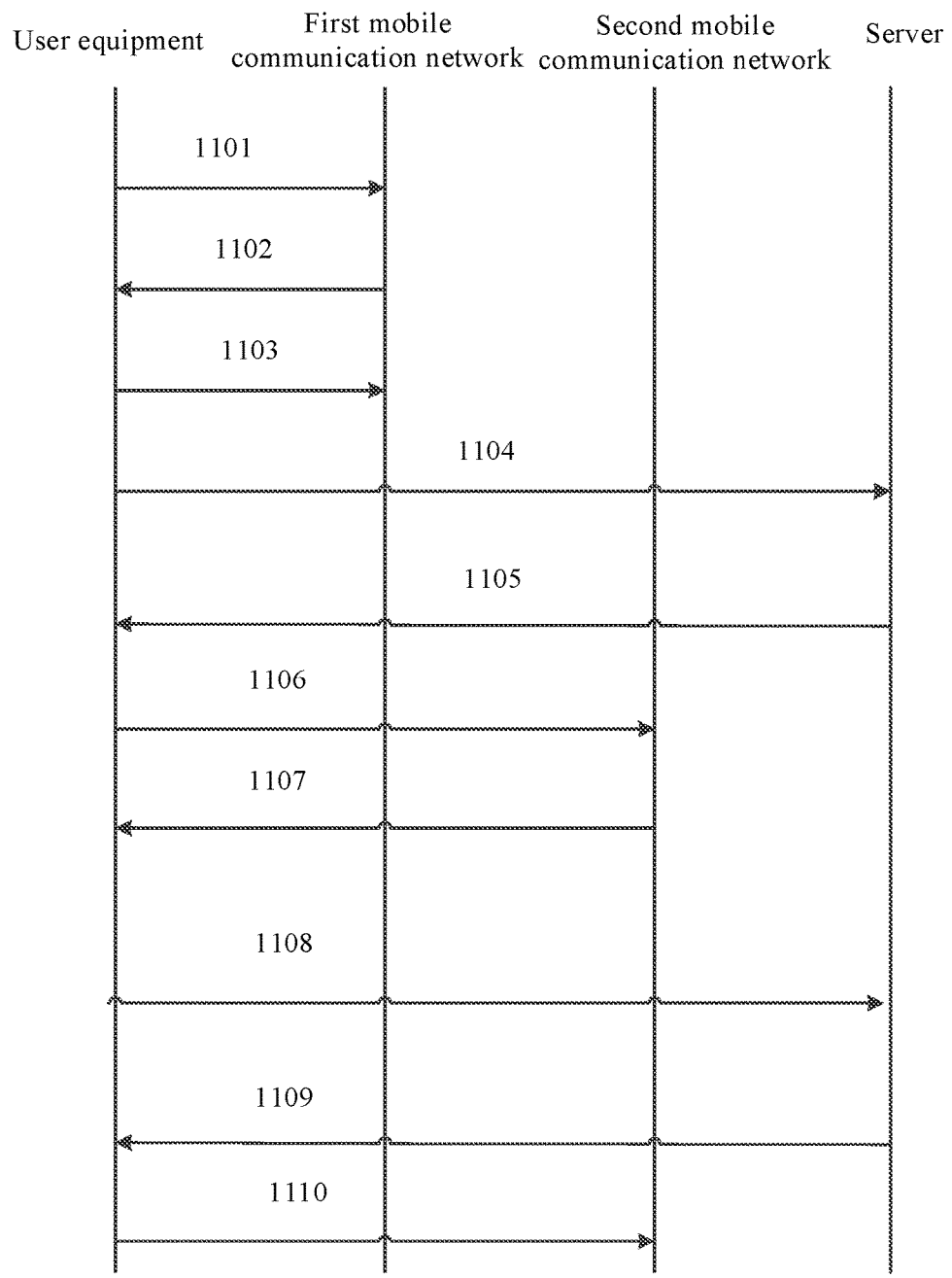
FIG. 11 is a signaling interaction diagram of the access method according to the present disclosure.

FIG. 11 is a signaling interaction diagram of the access method according to the present disclosure. As illustrated in FIG. 11, the access method according to the embodiment of the present disclosure includes the following steps:

step 1101: initiating an access request to a first mobile communication network according to a first subscriber identification number;

step 1102: acquiring an authentication request sent by the first mobile communication network;

step 1103: sending an authentication response to the first mobile communication network according to a predetermined rule and the acquired authentication request, to establish the first connection;

step 1104: requesting, via the first connection, a server to assign a subscriber identification number to the user equipment, wherein the assigned subscriber identification number is a subscriber identification number corresponding to a SIM card in the server, and the subscriber identification number is a subscriber identification number at a location where the user equipment is currently located;

step 1105: acquiring, via the first connection, the second subscriber identification number assigned by the server;

step 1106: initiating an access request to a second mobile communication network according to the second subscriber identification number;

step 1107: acquiring an authentication request sent by the second mobile communication network;

step 1108: sending the authentication request to the server, such that the SIM card in the server determines an authentication response according to the authentication request;

step 1109: acquiring the authentication response sent by the server; and step 1110: sending the authentication response to the second mobile communication network, to establish the second connection between the user equipment and the second mobile communication network.

In the embodiments of the present disclosure, a first connection between a user equipment and a first mobile communication network is established according to a first subscriber identification number; a local second subscriber identification number at a location where the user equipment is currently located is then acquired via the first connection; and a second connection between the user equipment and the second mobile communication network is established according to a second subscriber identification number, such that the user equipment may establish a local wireless communication connection via a local second subscriber identification number servicing the current location, and thus traffic fees are locally charged. Therefore, a user does not need to replace a SIM card of the user equipment, which conveniently reduces the fees of calls and traffic.

Embodiments of the present disclosure further include a communication system which includes the above user equipment and the server, wherein the user equipment and the server perform signaling interaction and data transmission.

A person skilled in the art would clearly acknowledge that for ease and brevity of description, the apparatuses are described by only using division of the above functional modules as examples. In practice, the functions may be assigned to different functional modules for implementation as required. To be specific, the internal structure of the apparatus is divided into different functional modules to implement all or part of the above-described functions. The specific working processes of the system, apparatus and units described above may be referenced to the corresponding process in the method embodiments, which are not described herein any further.

In the several embodiments provided in the present application, it should be understood that the disclosed system, apparatus and method may be practiced in other manners. The above described device embodiments are merely illustrative. For example, the divisions of the modules or units are merely logical function divisions and may be other divisions in actual practice. For example, multiple units or components may be combined or integrated into another system, or some features can be ignored or not performed. In addition, the displayed or discussed mutual couplings or direct couplings or communication connections are practiced through some interfaces. The indirect couplings or communication connections between the apparatuses or units may be practiced in electronic, mechanical or other forms.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all the units may be selected according to the actual needs to achieve the objectives of the technical solutions of the embodiments.

In addition, various functional units according to the embodiments of the present application may be integrated in a processing unit, or may be each independently and physically present; alternatively, one or more than one units are integrated in a unit. The above integrated unit may be practiced in the form of hardware, and may also be practiced in the form of a software functional unit.

If the integrated unit is implemented in the form of a software functional module, and is sold or used as an independent product, the integrated unit may also be stored in a computer readable storage medium. Based on such understandings, the technical solutions or part of the technical solutions disclosed in the present disclosure that makes contributions to the related art may be essentially embodied in the form of a software product. The software product may be stored in a storage medium. The software product includes a number of instructions that enable a computer (a PC, a server, a network device, or the like) device to execute all or a part of the steps of the methods provided in the embodiments of the present disclosure. The storage media include various media capable of storing program code, for example, a U disk, a mobile hard disk, a read-only memory (ROM), a random access memory (RAM), a magnetic disk, or a compact disc read-only memory (CD-ROM).

It should be finally noted that the above-described embodiments are merely for illustration of the present disclosure, but are not intended to limit the present disclosure. Although the present disclosure is described in detail with reference to these embodiments, a person skilled in the art may also make various modifications to the technical solutions disclosed in the embodiments, or make equivalent replacements to a part of the technical features contained therein. Such modifications or replacement, made without departing from the principles of the present disclosure, shall fall within the scope of the present disclosure.

What is claimed is:

1. An access method, comprising:
   establishing a first connection between a user equipment and a first mobile communication network according to a first subscriber identification number;
   requesting, via the first connection, a server to assign a subscriber identification number to the user equipment, wherein the subscriber identification number corresponds to an entity subscriber identity module (SIM) card in the server, and the subscriber identification number is at a location where the user equipment is currently located;
   acquiring, via the first connection, a second subscriber identification number assigned by the server to the user equipment; and
   establishing a second connection between the user equipment and a second mobile communication network servicing the current location according to the second subscriber identification number.

2. The method according to claim 1, wherein the establishing a second connection between the user equipment and a second mobile communication network servicing the current location according to the second subscriber identification number comprises the following steps performed via the first connection:
   initiating an access request to the second mobile communication network according to the second subscriber identification number;
   acquiring an authentication request sent by the second mobile communication network;
   sending the authentication request to the server, such that the entity SIM card in the server determines an authentication response according to the authentication request;
   acquiring the authentication response sent by the server; and
   sending the authentication response to the second mobile communication network, to establish the second connection between the user equipment and the second mobile communication network.

3. The method according to claim 1, further comprising:
   releasing the first connection between the user equipment and the first mobile communication network.

4. The method according to claim 1, further comprising:
   establishing a wireless local area network connection between the user equipment and a first user equipment.

5. A user equipment, comprising:
   a processor, configured to establish a first connection between the user equipment and a first mobile communication network according to a first subscriber identification number;
   a transmitter, configured to request, via the first connection, a server to assign a subscriber identification number to the user equipment, wherein the subscriber identification number is corresponds to an entity subscriber identity module (SIM) card in the server, and the subscriber identification number is at a location where the user equipment is currently located; and
   a receiver, configured to acquire, via the first connection, a second subscriber identification number assigned by the server to the user equipment;
   wherein the processor is further configured to establish a second connection between the user equipment and a second mobile communication network servicing the current location according to the second subscriber identification number.

6. The user equipment according to claim 5, wherein
   the processor is further configured to initiate an access request to the second mobile communication network via the first connection according to the second subscriber identification number;
   the receiver is further configured to acquire an authentication request sent by the second mobile communication network via the first connection;
   the transmitter is further configured to send the authentication request to the server via the first connection, such that the entity SIM card in the server determines an authentication response according to the authentication request;

the receiver is further configured to acquire, via the first connection, the authentication response sent by the server; and the transmitter is further configured to send the authentication response to the second mobile communication network via the first connection, to establish the second connection between the user equipment and the second mobile communication network.

7. The user equipment according to claim 6, further comprising:

the processor is further configured to release the first connection between the user equipment and the first mobile communication network.

8. The user equipment according to claim 5, wherein the processor is further configured to establish a wireless local area network connection with a first user equipment.

9. An access method, comprising:

acquiring a request from a user equipment via a first connection, wherein the request is used for requesting a server to assign a subscriber identification number to the user equipment, and the first connection is a connection between the user equipment and a first mobile communication network; and assigning a second subscriber identification number to the user equipment according to the request, such that the user equipment establishes a second connection with a local second mobile communication network at a location where the user equipment is located, wherein the second subscriber identification number corresponds to an entity subscriber identity module (SIM) card in the server.

10. The method according to claim 9, wherein the request carries information of the location where the user equipment is located;

when the request carries the information of the location where the user equipment is located, the assigning the second subscriber identification number to the user equipment according to the request comprises:

assigning the second subscriber identification number to the user equipment according to the information of the location where the user equipment is located, wherein the second subscriber identification number is a subscriber identification number at a location where the user equipment is currently located.

11. The method according to claim 10, further comprising:

the request further carries type information of the user equipment; and when the request carries the type information of the user equipment, the assigning the second subscriber identification number to the user equipment according to the request specifically comprises:

assigning the second subscriber identification number to the user equipment according to the type information of the user equipment.

12. The method according to claim 9, further comprising:

acquiring an authentication request sent by the user equipment, wherein the authentication request is sent by the second mobile communication network to the user equipment according to an access request from the user equipment; and sending an authentication response to the user equipment, such that the user equipment establishes a second connection with the second mobile communication network according to the authentication response, wherein the authentication response is determined by the entity SIM card in the server according to the authentication request.

13. A server, comprising:

a receiver, configured to acquire a request from a user equipment via a first connection, wherein the request is used for requesting the server to assign a subscriber identification number to the user equipment, and the first connection is a connection between the user equipment and a first mobile communication network; and a transmitter, configured to assign a second subscriber identification number to the user equipment according to the request, such that the user equipment establishes a second connection with a local second mobile communication network at a location where the user equipment is located, wherein the second subscriber identification number corresponds to an entity subscriber identity module (SIM) card in the server.

14. The server according to claim 13, wherein when the request carries information of a location where the user equipment is located, the transmitter is configured to assign the second subscriber identification number to the user equipment according to the information of the location where the user equipment is located, wherein the second subscriber identification number is a subscriber identification number at a location where the user equipment is currently located.

15. The server according to claim 14, wherein when the request carries type information of the user equipment, the transmitter is configured to assign the second subscriber identification number to the user equipment according to the type information of the user equipment.

16. The server according to claim 13, wherein:

the receiver is further configured to acquire an authentication request sent by the user equipment, wherein the authentication request is sent by the second mobile communication network to the user equipment according to an access request from the user equipment; and the transmitter is further configured to send an authentication response to the user equipment, such that the user equipment establishes a second connection with the second mobile communication network according to the authentication response, wherein the authentication response is determined by the SIM card in the server according to the authentication request.

* * * * *